US012794226B2

(12) United States Patent
Thiriet et al.

(10) Patent No.: US 12,794,226 B2
(45) Date of Patent: Nov. 10, 2026

(54) HYBRID ELECTRICAL ARCHITECTURE FOR AN AIRCRAFT

(71) Applicant: SAFRAN HELICOPTER ENGINES, Bordes (FR)

(72) Inventors: Romain Jean Gilbert Thiriet, Moissy-Cramayel (FR); David Bernard Martin Lemay, Moissy-Cramayel (FR); Sophie Humbert, Moissy-Cramayel (FR)

(73) Assignee: SAFRAN HELICOPTER ENGINES, Bordes (FR)

( * ) Notice: Subject to any disclaimer, the term of this patent is extended or adjusted under 35 U.S.C. 154(b) by 0 days.

(21) Appl. No.: 18/861,833

(22) PCT Filed: Apr. 28, 2023

(86) PCT No.: PCT/FR2023/000070
§ 371 (c)(1),
(2) Date: Oct. 30, 2024

(87) PCT Pub. No.: WO2023/214128
PCT Pub. Date: Nov. 9, 2023

(65) Prior Publication Data

US 2025/0296690 A1 Sep. 25, 2025

(30) Foreign Application Priority Data

May 2, 2022 (FR) ....................................... 2204148

(51) Int. Cl.
*B64D 27/33* (2024.01)
*B64D 31/14* (2006.01)
(Continued)

(52) U.S. Cl.
CPC .............. *H02J 1/082* (2020.01); *B64D 27/33* (2024.01); *B64D 31/14* (2013.01); *B64D 31/18* (2024.01); *B64D 2221/00* (2013.01)

(58) Field of Classification Search
CPC ...... B64D 31/18; B64D 27/026; B64D 27/06; B64D 27/12; B64D 27/33
See application file for complete search history.

(56) References Cited

U.S. PATENT DOCUMENTS

2012/0025032 A1* 2/2012 Hopdjanian ............ B64C 27/14 903/905
2025/0223048 A1* 7/2025 Lepretre ................ B64D 27/33

FOREIGN PATENT DOCUMENTS

FR 2 962 404 A1 1/2012

OTHER PUBLICATIONS

IEEE, Operating modes and converter options of DWPMS for hybrid electric vehicles, Nov. 14, 2016, IEEE, Abstract. (Year: 2016).*

(Continued)

*Primary Examiner* — Justin Michael Heston
(74) *Attorney, Agent, or Firm* — CHRISTENSEN O'CONNOR JOHNSON KINDNESS PLLC

(57) ABSTRACT

A hybrid electrical architecture for an aircraft includes a turbomachine and a reduction gearbox configured to rotate at least one propulsion member of the aircraft. The architecture also includes at least one low-voltage electrical network with at least one low-voltage electric machine mounted on the reduction gearbox or on the turbomachine and a high-voltage electrical network with high-voltage electric machines mounted on the turbomachine.

11 Claims, 5 Drawing Sheets

(51) Int. Cl.
*B64D 31/18* (2024.01)
*H02J 1/082* (2026.01)

(56) References Cited

OTHER PUBLICATIONS

International Search Report mailed Aug. 7, 2023, issued in corresponding International Application No. PCT/FR2023/000070, filed Apr. 28, 2023, 5 pages.
Written Opinion mailed Aug. 7, 2023, issued in corresponding International Application No. PCT/FR2023/000070, filed Apr. 28, 2023, 5 pages.

* cited by examiner

HYBRID ELECTRICAL ARCHITECTURE FOR AN AIRCRAFT

FIELD OF THE DISCLOSURE

The disclosure relates to the field of so-called hybrid propulsion aircraft, i.e. aircrafts that combine two propulsion sources of different kinds, for example a thermal source and an electrical source. In particular, it concerns an aircraft hybrid electrical architecture.

BACKGROUND

The document FR-A1-2 962 404 describes a hybrid electrical architecture in which an auxiliary electrical network can be disconnected.

The architecture described in this document is a so-called parallel hybrid electrical architecture in which, on the one hand, two high-voltage electrical machines are mounted on the main gearbox and operate in a reversible manner, i.e. they are capable of both supplying torque to one or more rotors via the main power gear box or generating electrical energy from a torque drawn from one or more shafts via the main power gear box. On the other hand, a so-called low-voltage electrical machine (i.e. operating at 28 volts, for example) is driven by the high-pressure body of the aircraft's turbomachine to operate as a generator (of electrical energy) or as a motor to start the turbomachine.

Although this architecture theoretically enables electrical power to be transferred between low-voltage and high-voltage electrical machines, it does have a number of drawbacks.

Firstly, the low-voltage electrical machine can only operate in motor mode when the turbomachine is starting up. It cannot mechanically assist the high-pressure body (by providing torque) of the turbomachine continuously beyond 80% N1. The design of the electrical machine and the accessory gearbox (or AGB) means that it is not possible to supply the motor torque to drive the high-pressure body above around 50-60% N1. This is due in particular to the current technology of electrical machines used as starters/generators and to the fact that no such need has yet been identified.

In addition, a low-voltage operation rapidly induces high electrical currents in order to transfer significant power (of the order of a few tens of kiloWatts), which implies the use of large cross-sections of electrical conductors and leads to high mass.

In addition, the transfer of electrical power from the low-voltage electrical machine to a high-voltage electrical machine takes place via two different network voltages, which requires the use of a converter and therefore greatly reduces the efficiency of this power transfer. In addition, this creates a common point between the low-voltage and high-voltage networks, which increases the risk of faults spreading between the two networks.

Finally, the weight penalty associated with the use of a high-voltage battery in the architecture can be prohibitive for aerial work missions.

SUMMARY

The present disclosure proposes a solution to these disadvantages.

In particular, the objectives of the disclosure are both to enable power to be transferred between the high-pressure body and the low-pressure body or the main power gear box of the aircraft, in both possible directions of transfer, using a high-voltage network (also known as the internal hybridisation electrical network) only (i.e. without calling on the low-voltage electrical network used to supply the aircraft equipment) and to enable the internal hybridisation electrical network (i.e. the propulsive electrical network) from the electrical networks configured to supply aircraft equipment (i.e. the non-propulsive electrical network). In other words, the non-propulsive and propulsive electrical networks are segregated.

To this end, a first aspect of the disclosure relates to a hybrid electrical architecture for an aircraft, the architecture comprising a turbomachine and a reduction gear intended to drive in rotation at least one propulsion member of the aircraft, the architecture further comprising,

- a low-voltage electrical network comprising a low-voltage electrical energy storage device and at least one low-voltage electrical machine electrically connected to a first electrical bus intended to supply electrical energy to loads of the aircraft, and,
- a high-voltage electrical network comprising two high-voltage electrical machines electrically connected to a second electrical bus, the second electrical bus being electrically connected to the first electrical bus via an electrical converter of the high-voltage electrical network and a first contactor of the low-voltage electrical network, the architecture being characterised in that,
- the two high-voltage electrical machines are mounted on the turbomachine and each mechanically coupled to a shaft of the turbomachine, and,
- the at least one low-voltage electrical machine is mounted on the reduction gear or on the turbomachine and mechanically coupled to the reduction gear or to a shaft of the turbomachine.

In one embodiment, a first high-voltage electrical machine is mounted on a low-pressure body of the turbomachine and mechanically coupled to a shaft of the low-pressure body, a second high-voltage electrical machine is mounted on a high-pressure body of the turbomachine and mechanically coupled to a shaft of the high-pressure body, and a first low-voltage electrical machine is mechanically coupled to the reduction gear.

In another embodiment, the high-voltage network also comprises a high-voltage electrical energy storage device connected to the second electrical bus, preferably via an electrical protection device.

According to another embodiment, a first high-voltage electrical machine is mounted on a low-pressure body of the turbomachine and mechanically coupled to a shaft of the low-pressure body, a second high-voltage electrical machine is mounted on a high-pressure body of the turbomachine and mechanically coupled to a shaft of the high-pressure body, and a first low-voltage electrical machine is also mounted on the high-pressure body of the turbomachine and mechanically coupled to a shaft of the high-pressure body.

In another embodiment, the second high-voltage electrical machine and the first low-voltage electrical machine are separate windings of a dual-winding electrical machine, the separate windings being isolated from one another by galvanic insulation.

In another embodiment, a second low-voltage electrical machine is mounted on the low-pressure body of the turbomachine and coupled to a shaft of the low-pressure body.

In another embodiment, the first high-voltage electrical machine and the second low-voltage electrical machine are separate windings of a dual-winding electrical machine, the separate windings being isolated from each other by galvanic insulation.

According to another embodiment, the first low-voltage electrical machine and the second low-voltage electrical machine are respectively mechanically coupled to movement take-offs of the high-pressure body of the turbomachine and of the low-pressure body of the turbomachine, which are distinct from movement take-offs of the high-pressure body and of the low-pressure body to which the first high-voltage electrical machine and the second high-voltage electrical machine are coupled.

In another embodiment, the high-voltage electrical machines are electrically connected to the second electrical bus via second contactors and the at least one low-voltage electrical machine is electrically connected to the first electrical bus via at least one third contactor.

In addition, the disclosure according to a second aspect also relates to an aircraft comprising a turbomachine configured to drive a propulsion member in rotation and a hybrid electrical architecture according to any one of the preceding claims.

DESCRIPTION OF THE DRAWINGS

The disclosure will be better understood, and other details, characteristics and advantages of the present disclosure will become clearer from the following description made by way of non-limiting example and with reference to the attached drawings, in which.

DETAILED DESCRIPTION

Figure 1:
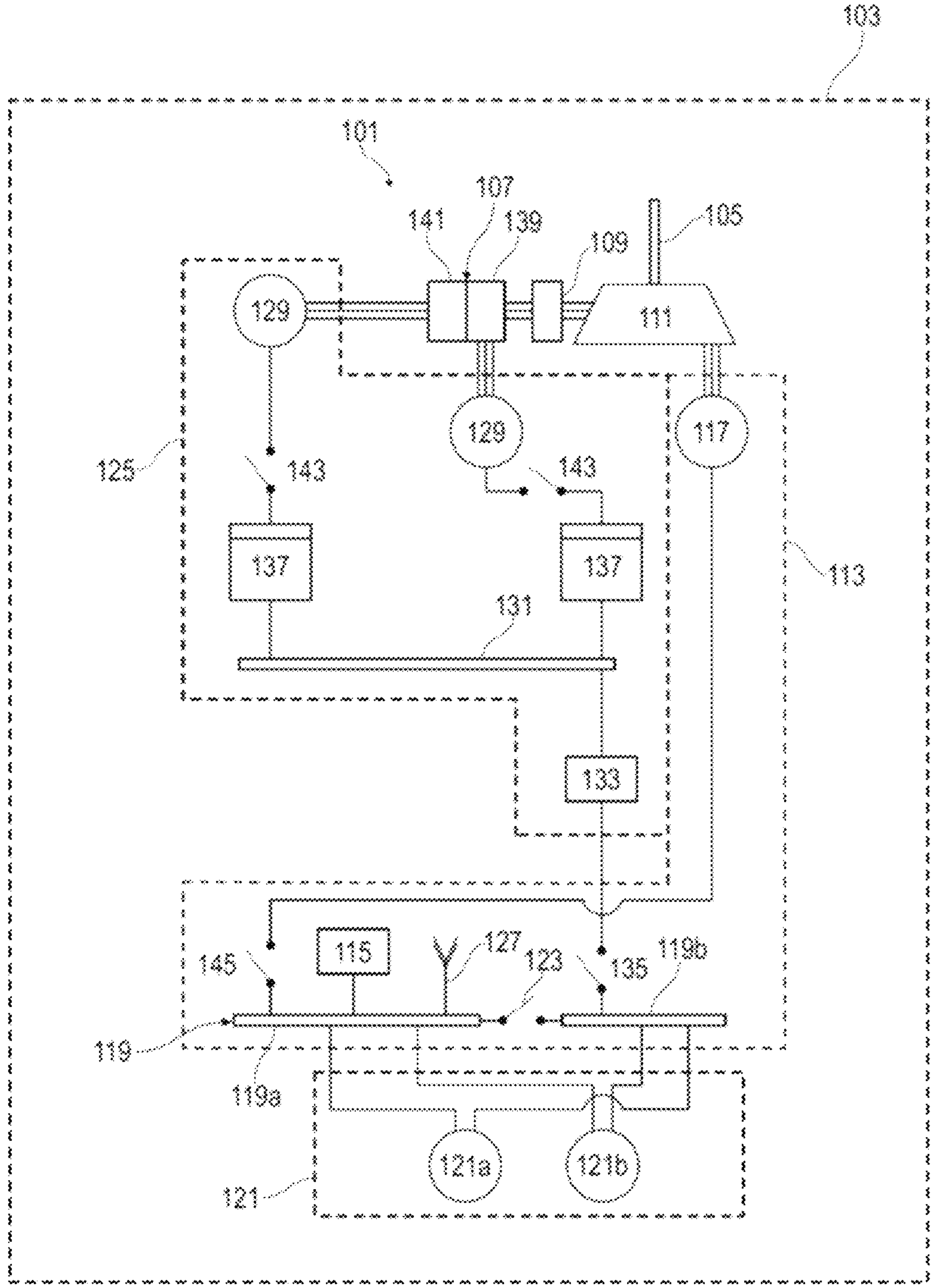
FIG. 1 is a schematic representation of an aircraft comprising a hybrid electrical architecture according to a first embodiment of the disclosure.

With reference to FIG. 1, we will now describe a first embodiment of a hybrid electrical architecture 101 of an aircraft 103 according to the disclosure.

In FIG. 1, as in the following figures, the mechanical power passing between the various elements of the architecture is symbolised by three parallel lines, while the electrical power is symbolised by a single line.

In the non-limiting example shown, the aircraft 103 is a rotary wing aircraft, such as a helicopter. In this case, the rotary wing (not shown) is driven in rotation by a propulsion member 105 of the aircraft 103.

More specifically, the architecture 101 comprises a turbomachine 107 mechanically coupled, by means of an overrunning clutch 109, to a reduction gear 111, in this case a main power gear box 111 configured to drive in rotation the propulsion member 105 (in this case a rotor mast called the rotor in what follows) of the aircraft 103. Thus, during operation, the turbomachine 107 rotates the main power gear box 111, which in turn rotates the rotor 105.

The person skilled in the art will appreciate that the disclosure also applies to an aircraft using at least one propulsion assembly of the electric hybrid turboprop engine type, having as its propulsion member a pusher propeller and in which the reduction gear is a "Power Gear Box".

In addition, the main power gear box 111 can also be configured to rotate other rotors not shown, for example an anti-torque rotor (also known as a tail rotor).

The architecture 101 also comprises a low-voltage electrical network 113 which comprises a low-voltage electrical energy storage device 115, such as a battery, and at least one low-voltage electrical machine 117. Here and in what follows, the term "low voltage" refers to a voltage of less than 50 volts, such as 28 volts. The person skilled in the art will also appreciate that, in this architecture, the low-voltage electrical machine 117 can be optional, particularly when it is used in a light helicopter and more particularly a non-IFR light helicopter (i.e. not intended for instrument flight).

The low-voltage electrical machine 117 and the low-voltage electrical energy storage device 115 are electrically connected to an electrical bus 119 designed to supply electrical energy to loads 121 on the aircraft 103.

By way of example, the low-voltage electrical machine 117 (which provides, for example, an electrical power of less than 9 Kilowatts) and the low-voltage electrical energy storage device 115 deliver an electrical voltage of 28 Volts so that the low-voltage electrical network has a nominal voltage equal to 28 Volts.

In the non-limiting example shown in FIG. 1, the electrical bus 119 is divided into two parts 119*a* and 119*b* which are connected together by a contactor 123 enabling the two parts 119*a* and 119*b* of the electrical bus 119 to be electrically connected or disconnected and consequently to segregate the part of the bus supplied by the low-voltage electrical network 113, i.e. the part 119*a*, and the part of the bus supplied by a high-voltage electrical network 125 described in more detail below.

In addition, in this configuration, the loads 121 can also be split into two groups of loads 121*a* and 121*b* which can be supplied by the part 119*a* and/or the part 119*b* of the electrical bus 119 so that an "emergency" supply can be provided to each of the loads 121. The two groups of loads 121*a* and 121*b* may be, for example, respectively the aircraft 103 equipment whose operation is considered essential and the aircraft 103 equipment whose operation is considered accessory.

In the non-limiting example described here, the low-voltage electrical network 113 also comprises a park socket 127, which can be connected to a park unit, i.e. a generator forming part of the ground infrastructure, to which the aircraft can be connected when it is parked in order to supply it with electrical energy and which supplies electrical power (at a voltage of 28V).

As mentioned above, the architecture 101 also includes a high-voltage electrical network 125 comprising two high-voltage electrical machines 129 electrically connected to an electrical bus 131. The electrical bus 131 is electrically connected to the electrical bus 119 via an electrical converter 133 which is also included in the high-voltage electrical network 125. Here and in what follows, the expression "high voltage" refers to a voltage greater than 50 Volts. As a non-limitative example, the voltage levels used can be 115 Volts AC or 270 Volts, 540 Volts or 800 Volts DC. In addition, there is no upper limit to the voltage value corresponding to "high voltage".

The electrical converter 133 may be, for example, a DC/DC converter or an AC/DC converter, the role of which is, in all cases, to adapt the voltage of the high-voltage electrical network 125 to the voltage of the low-voltage electrical network 113.

In addition, the electrical converter 133 is connected to the electrical bus 119 of the low-voltage electrical network 113 via a contactor 135 which is included in the low-voltage electrical network 113.

The high-voltage electrical network 125 also comprises Electrical Power Control Unit 137, also referred to by the acronym EPCU, electrically connected to the high-voltage electrical machines 129, and configured to regulate the voltage delivered by the high-voltage electrical machines 129 and to enable them to be controlled.

In the example shown in FIG. 1, the two high-voltage electrical machines 129 are mounted on the turbomachine 107 and mechanically coupled to a shaft (not shown) of the turbomachine 107. The fact that the high-voltage electrical machines 129 are mounted on the turbomachine 107 means that there are at least two mechanical inputs on the turbomachine 107 to connect both the high-pressure body and the low-pressure body to the electrical machines 129. In addition, there are at least two rotating power take-offs connected to the rotor shaft of each electrical machine 129, each configured to transmit the power supplied or taken off by the electrical machine, and at least two fixing interfaces for securing the static casing of the electrical machines 129 to the turbomachine 107.

In addition, the mechanical coupling in question means that the electrical machines can receive or supply torque to the shaft of the turbomachine to which they are coupled, depending on whether it is operating as a generator or an engine.

More specifically, in the configuration shown in FIG. 1, one of the two high-voltage electrical machines 129 is mounted on a low-pressure body 139 of the turbomachine 107 and is therefore mechanically coupled to a shaft of this low-pressure body 139. The other high-voltage electrical machine 129 is mounted on a high-pressure body 141 of the turbomachine 107 and is therefore mechanically coupled to a shaft of this high-pressure body 141. As a result, this high-voltage electrical machine 129, mechanically coupled to a shaft of this high-pressure body 141, is able to start the turbomachine 107.

The two high-voltage electrical machines 129 are reversible, i.e. they can drive the turbomachine 107 or draw mechanical power from the turbomachine 107 to generate electrical energy. The mechanical power can therefore be transferred from the high-pressure body 141 to the low-pressure body 139, and vice versa, via the high-voltage electrical machines 129. In addition, for such reversibility to be possible, the two EPCUs 137 are also designed to be reversible, since the electrical energy generated by either of the high-voltage electrical machines 129 must be able to pass through the ECPUs 137 via the electrical bus 131 which connects them electrically.

In addition, the low-voltage electrical machine 117 is mechanically coupled to the main power gear box 111. In this configuration, the low-voltage electrical machine 117 is used solely as a generator.

Figure 2:
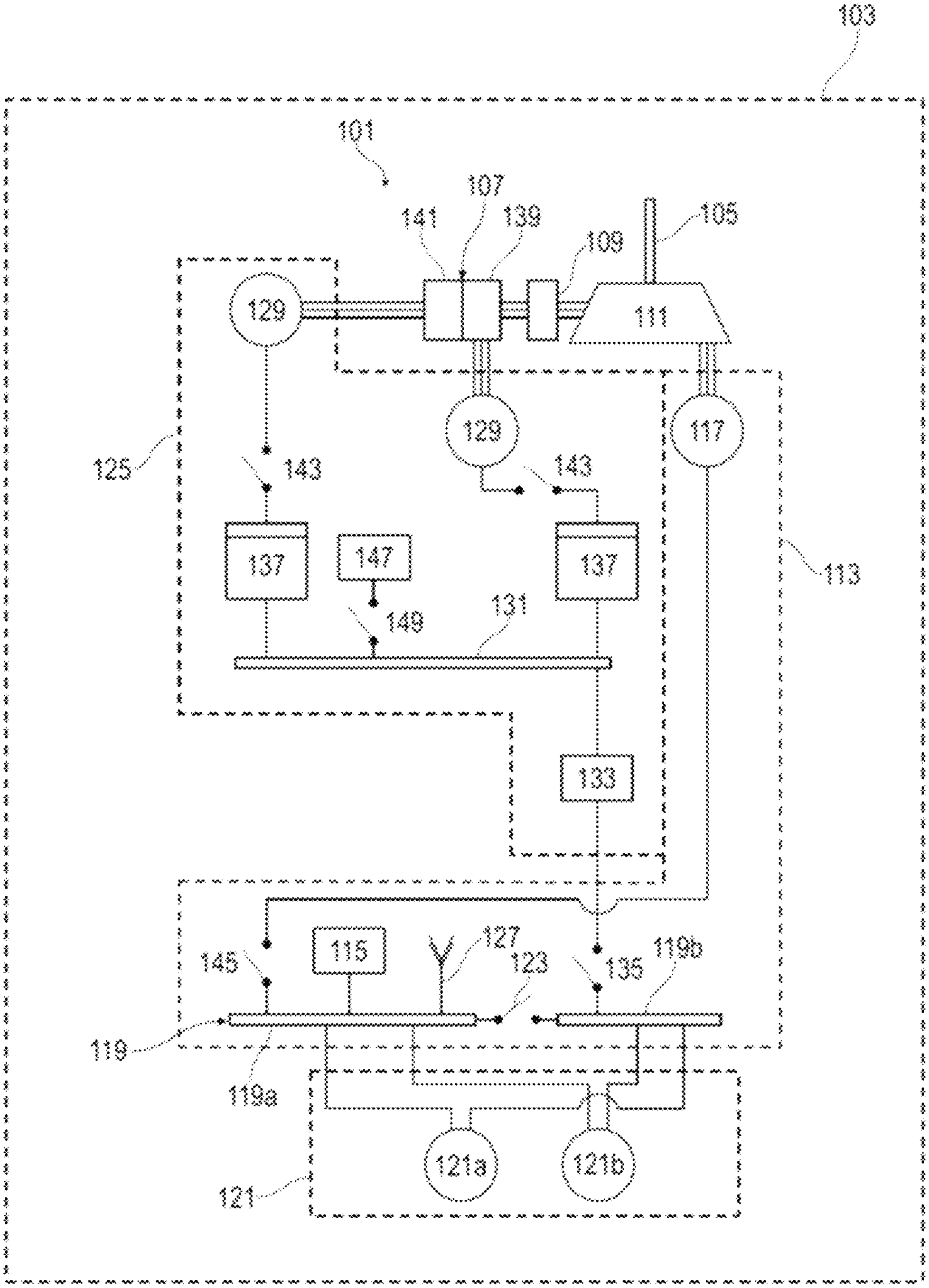
FIG. 2 is a schematic representation of an aircraft comprising a hybrid electrical architecture according to a second embodiment of the disclosure.

Finally, in addition to the contactors already mentioned above, the high-voltage electrical machines 129 are electrically connected to the electrical bus 131 by means of contactors 143 which allow, if necessary, to protect them respectively in the event of an electrical fault on the electrical bus 131 or to prevent an electrical fault from propagating from one electrical machine 129 to another. The low-voltage electrical machine 117 is also electrically connected to the electrical bus 119 via a contactor 145. FIG. 2 shows another embodiment of the hybrid electrical architecture 101 in which, in addition to all the elements already described with reference to FIG. 1, the high-voltage network 125 also comprises a high-voltage electrical energy storage device 147 connected to the electric bus 131. In addition, in the non-limiting example shown, the high-voltage electrical energy storage device 147 is connected to the electrical bus 131 via an electrical protection device 149. This electrical protection device 149 is configured to electrically isolate the energy storage device in the event of electrical damage to the network or to the storage device itself. This may be an electromechanical contactor, a static contactor or a combination device such as a pyro-contactor or pyro-fuse.

Advantageously, the high-voltage electrical energy storage device 147 can be used to stabilise the electric bus 131 and/or to provide an additional hybridisation source if required.

Figure 3:
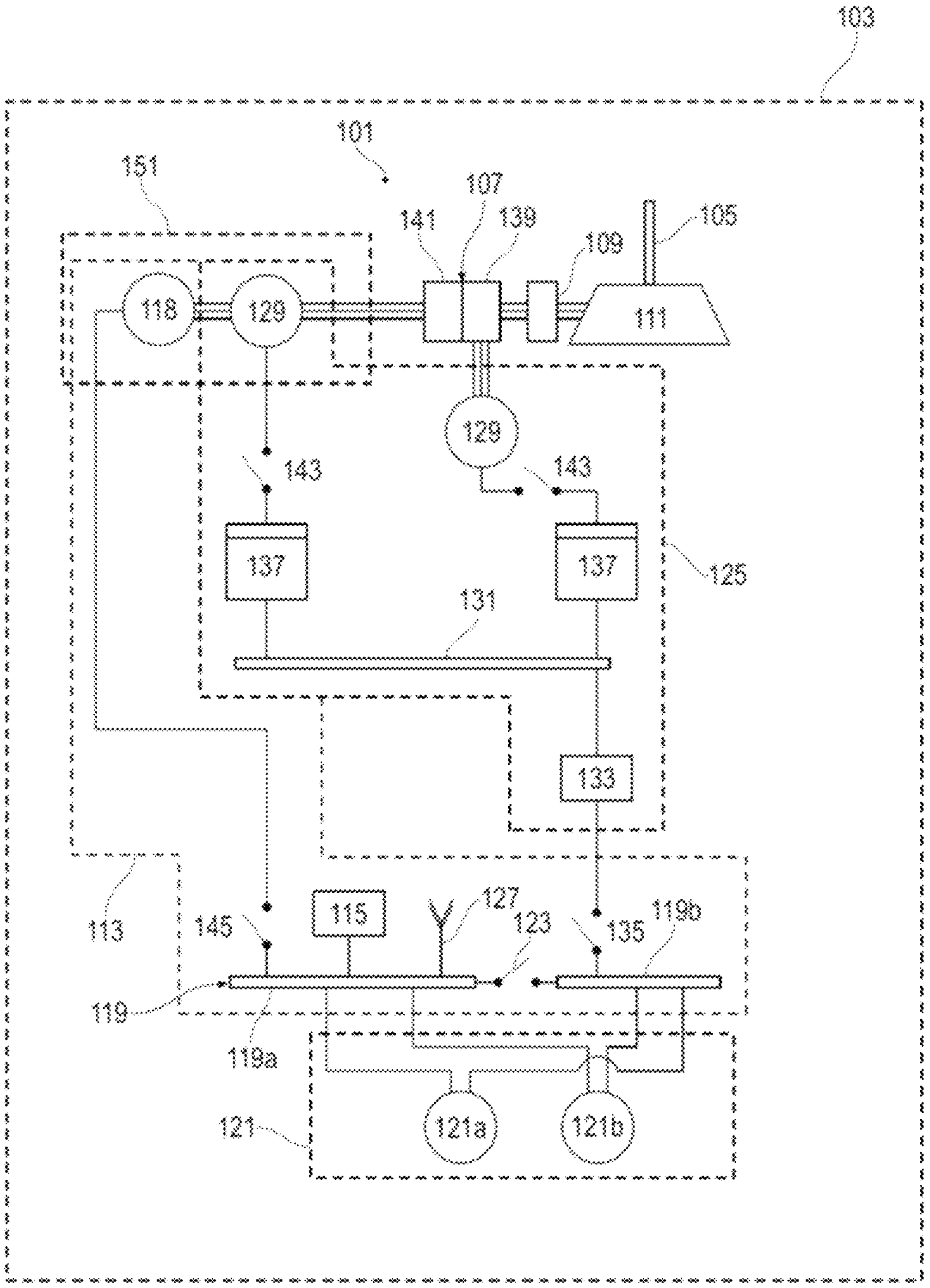
FIG. 3 is a schematic representation of an aircraft comprising a hybrid electrical architecture according to a third embodiment of the disclosure.

FIG. 3 also shows another embodiment of the hybrid electric architecture 101 in which, this time, a high-voltage electrical machine 129 is mounted on the low-pressure body 139 and mechanically coupled to a shaft of the low-pressure body 139, another high-voltage electrical machine 129 is mounted on the high-pressure body 141 and mechanically coupled to a shaft of the high-pressure body 141, and the low-voltage electrical machine 118 is also mounted on the high-pressure body 141 and mechanically coupled to a shaft of the high-pressure body 141. In this case, the low-voltage electrical machine 118 can also be used as a starter for the high-pressure body 141 of the turbomachine 107. In addition, the skilled person will appreciate that, in this configuration, the 133 converter is optional.

Furthermore, in the configuration shown in FIG. 3, the high-voltage electrical machine 129 and the low-voltage electrical machine 118 which are mounted on the high-pressure body 141 are in fact separate windings of a dual-winding electrical machine 151. These separate windings are isolated from each other by galvanic insulation to ensure segregation between the two electrical networks.

Figure 4:
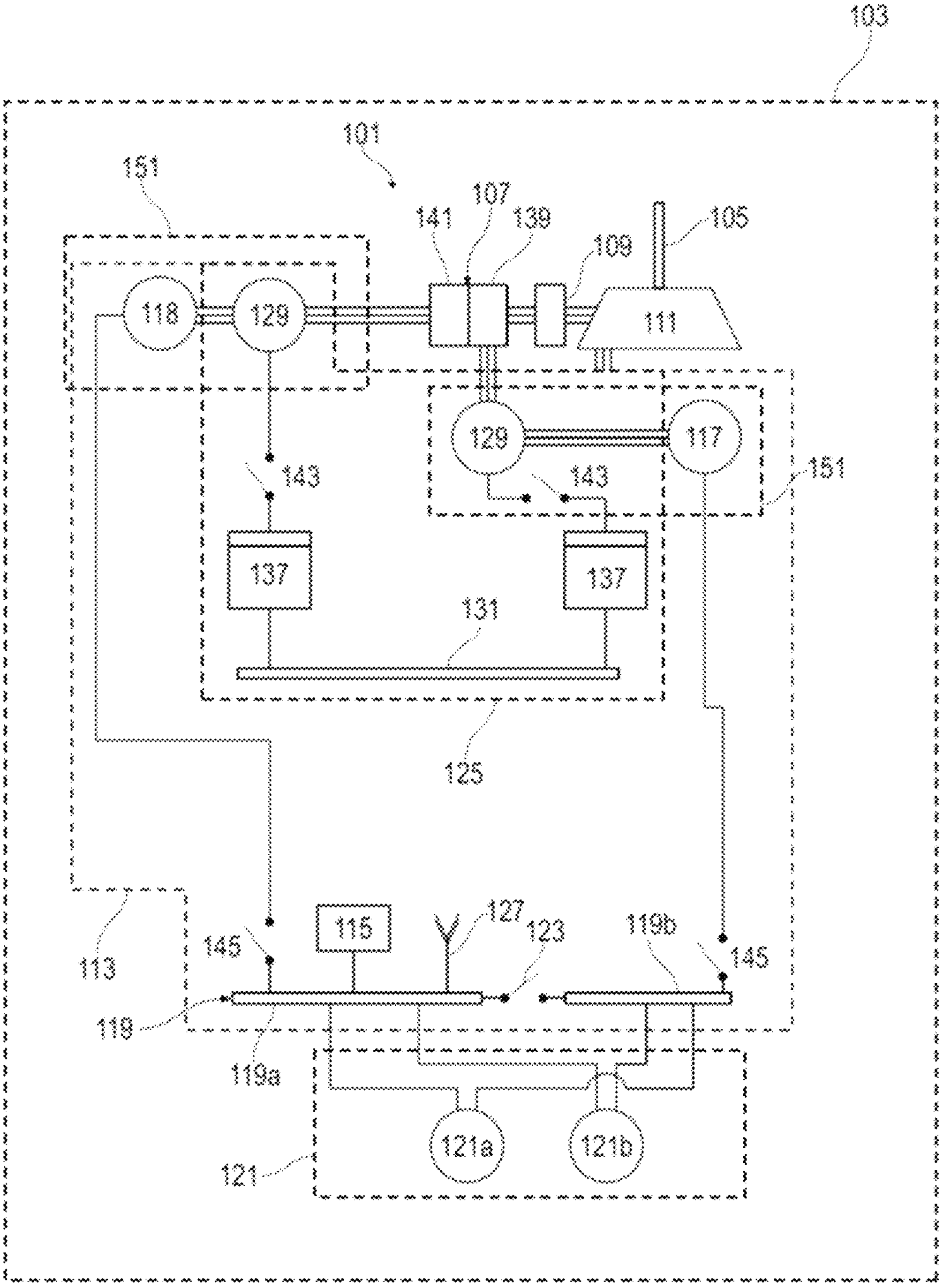
FIG. 4 is a schematic representation of an aircraft comprising a hybrid electrical architecture according to a fourth embodiment of the disclosure; and, FIG. 5 is a schematic representation of an aircraft comprising a hybrid electrical architecture according to a fifth embodiment of the disclosure.

FIG. 4 shows a further embodiment using the configuration of the embodiment shown in FIG. 3, but with the addition of a second low-voltage electrical machine 117 which is mounted on the low-pressure body 139 of the turbomachine 107 and coupled to a shaft of the low-pressure body 139. In addition, in this configuration, because there are a sufficient number of low voltage sources, the converter 133 and the contactor 135 are omitted.

Similarly, as in the case of the embodiment described with reference to FIG. 3, the high-voltage electrical machine 129 and the low-voltage electrical machine 117 mounted on the low-pressure body 139 are in fact separate windings of a dual-winding electrical machine 151. These separate windings are also isolated from each other by galvanic insulation.

Figure 5:
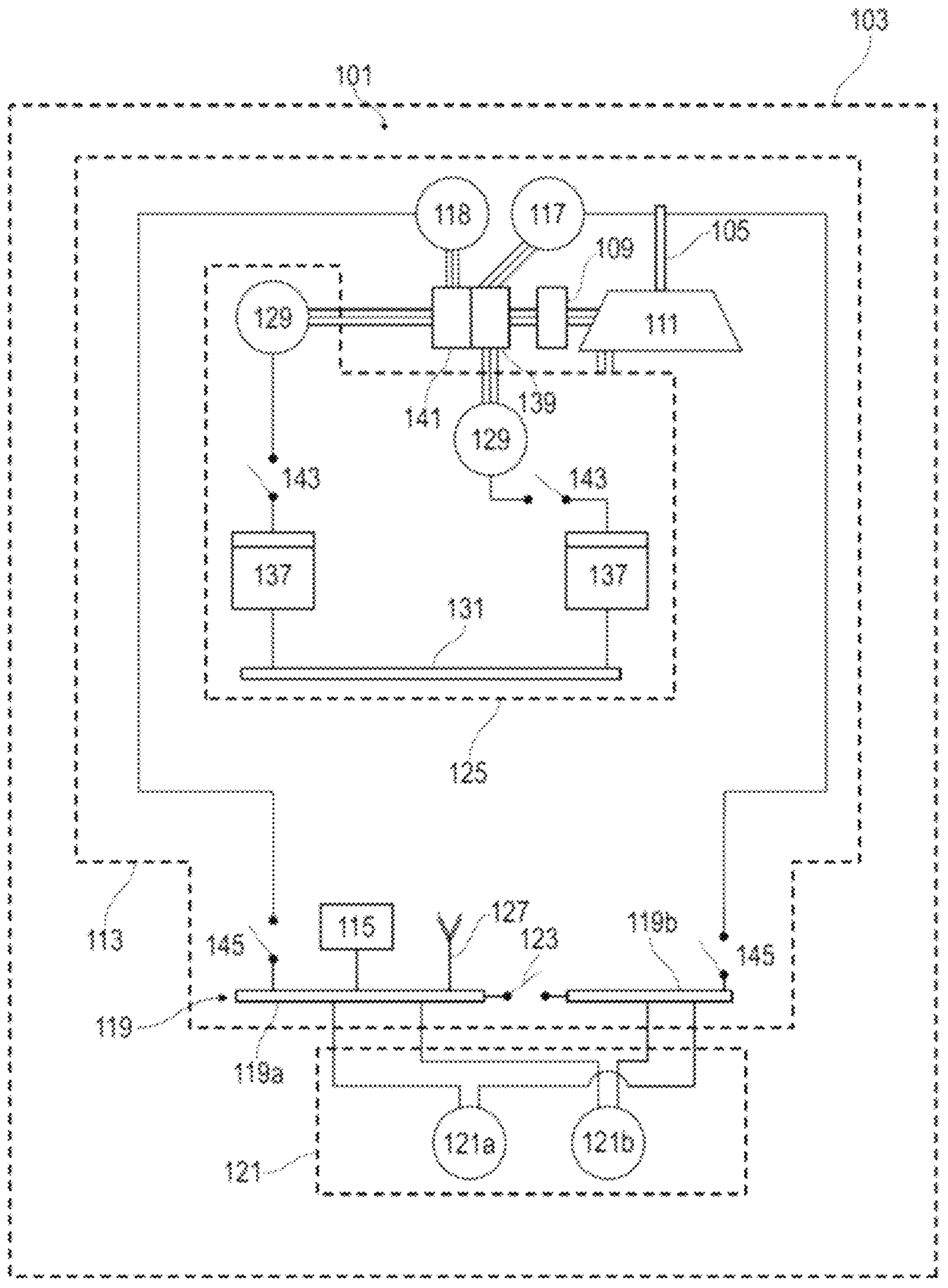

Finally, FIG. 5 shows a last embodiment in which the low-voltage electrical network 113 comprises two low-voltage electrical machines 118 and 117 which are respectively mechanically coupled to power take-offs of the high-pressure body 141 of the turbomachine 107 and the low-pressure body 139 of the turbomachine 107. These power take-offs are separate from the power take-offs of the high-pressure body 141 and the low-pressure body 139, to which the two high-voltage electrical machines 129 are respectively coupled. In addition, the low-voltage electrical machine 118 mounted on the high-pressure body 141 can be used as a generator or starter.

The invention claimed is:

1. A hybrid electrical architecture for an aircraft, said architecture comprising a turbomachine and a reduction gear configured to drive in rotation at least one propulsion member of said aircraft, said architecture further comprising, a low-voltage electrical network comprising a low-voltage electrical energy storage device and at least one low-voltage electrical machine electrically connected to a first electrical bus configured to supply electrical energy to loads on the aircraft, and, a high-voltage electrical network comprising two high-voltage electrical machines electrically connected to a second electrical bus, said second electrical bus being electrically connected to the first electrical bus via an electrical converter of said high-voltage electrical network and a first contactor of said low-voltage electrical network, wherein the two high-voltage electrical machines are mounted on the turbomachine and are each mechanically coupled to a shaft of said turbomachine, said turbomachine comprising two rotating power take-offs connected to the rotor shaft of each electrical machine, each capable of transmitting the power supplied or taken off by the electrical machine, and at least two fixing interfaces for securing the static casing of the electrical machines to the turbomachine, and said at least one low-voltage electrical machine is mounted on the reduction gear or on the turbomachine and is mechanically coupled to said reduction gear or to a shaft of said turbomachine.

2. The architecture according to claim 1, wherein a first of the two high-voltage electrical machines is mounted on a low-pressure body of the turbomachine and mechanically coupled to a shaft of said low-pressure body, a second of the two high-voltage electrical machines is mounted on a high-pressure body of the turbomachine and mechanically coupled to a shaft of said high-pressure body, and a first low-voltage electrical machine is mechanically coupled to the reduction gear.

3. The architecture according to claim 2, wherein the high-voltage network further comprises a high-voltage electrical energy storage device connected to the second electrical bus.

4. The architecture according to claim 3, wherein the high-voltage electrical energy storage device connected to the second electrical bus via an electrical protection device.

5. The architecture according to claim 1, wherein a first of the two high-voltage electrical machines is mounted on a low-pressure body of the turbomachine and mechanically coupled to a shaft of said low-pressure body, a second of the two high-voltage electrical machines is mounted on a high-pressure body of the turbomachine and mechanically coupled to a shaft of said high-pressure body, and a first low-voltage electrical machine is also mounted on the high-pressure body of the turbomachine and mechanically coupled to a shaft of said high-pressure body.

6. The architecture according to claim 5, wherein the second of the two high-voltage electrical machines and the first low-voltage electrical machine are separate windings of a dual-winding electrical machine, these separate windings being isolated from one another by galvanic insulation.

7. The architecture according to claim 5, wherein a second low-voltage electrical machine is mounted on the low-pressure body of the turbomachine and coupled to a shaft of said low-pressure body.

8. The architecture according to claim 7, wherein the first of the two high-voltage electrical machines and the second low-voltage electrical machine are separate windings of a dual-winding electrical machine, the separate windings being isolated from one another by galvanic insulation.

9. The architecture according to claim 7, wherein the first low-voltage electrical machine and the second low-voltage electrical machine are respectively mechanically coupled to movement take-offs of the high-pressure body of the turbomachine and of the low-pressure body of the turbomachine, which are distinct from movement take-offs of said high-pressure body and of said low-pressure body to which the first of the two high-voltage electrical machines and the second of the two high-voltage electrical machines are coupled.

10. The architecture according to claim 1, wherein the two high-voltage electrical machines are electrically connected to the second electrical bus via second contactors and said at least one low-voltage electrical machine is electrically connected to the first electrical bus via at least one third contactor.

11. An aircraft comprising a turbomachine configured to drive a propulsion member in rotation and a hybrid electrical architecture according to claim 1.

* * * * *